3,014,075
POLYMERIC ORGANOBORINES
Klaus A. Saegebarth, Christiana Hundred, Del., assignor to E. I. du Pont de Nemours and Company, Wilmington, Del., a corporation of Delaware
No Drawing. Filed Oct. 14, 1959, Ser. No. 846,247
4 Claims. (Cl. 260—606.5)

This invention relates to novel organoborine polymers and more particularly to those which are prepared from diborane and alkadienes possessing cumulated double bonds.

It is an object of the present invention to provide new orgpanoborine polymers. A further object is to provide organoborine polymers which are highly useful in that they may be converted into diols. A still further object is to provide a process for the preparation of these organoborine polymers from diborane and alkadienes possessing cumulated double bonds. Further objects will appear hereinafter.

These and other objects of this invention are accomplished by the novel solid organoborine polymers consisting essentially of a plurality of units having the structure

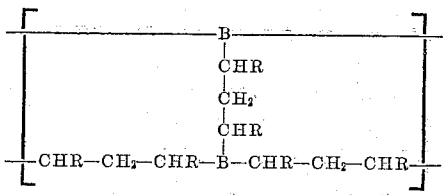

wherein R is hydrogen or a lower alkyl radical, with the terminal carbon atoms of one unit being joined to separate boron atoms in adjacent units, and the terminal boron atom of one unit being joined to separate terminal carbon atoms of adjacent units. These polymers are obtained by reacting diborane with an alkadiene possessing cumulated double bonds in the presence of a saturated, stable aliphatic ether in an inert solvent.

The diborane which is used in preparing the novel organoborine polymers of the present invention may be prepared by adding a solution of sodium borohydride to a solution of boron trifluoride etherate. This method of preparation is more particularly described in "Journal of Organic Chemistry," vol. 22, page 1137 (1957). The sodium borohydride and boron trifluoride etherate solution is preferably made using the dimethyl ether of diethylene glycol as a solvent. If desired, tetrahydrofuran or diethyl ether or di-n-butyl ether may be used as the solvent. The use of sodium borohydride is preferred since it is one of the most readily available borohydride reagents; however, other compounds such as potassium borohydride, lithium borohydride, calcium borohydride, or magnesium borohydride can be used. Also, the use of boron trifluoride etherate is preferred because here again it is a readily available liquid. However, in general, the etherates of any saturated acyclic low molecular weight aliphatic ether with boron trifluoride may be used. In preparing the diborane the solution of sodium borohydride is added to the solution of boron trifluoride etherate just fast enough to maintain gentle gas evolution. The formation of diborane is quite exothermic. It is to be understood that other methods of preparation can be used for the diborane such as reacting boron trifluoride with lithium aluminum hydride.

The alkadienes which are used in preparing the novel organoborine polymers of the present invention possess a cumulated double bond structure and conform to the general formula RHC=C=CHR wherein R is hydrogen or a lower alkyl radical. Representative compounds include propadiene or allene which is preferred, 1,2-butadiene, 1,2-pentadiene, 1,2-hexadiene, 1,2-heptadiene, 2,2-dimethyl pentadiene-3,4, 2-methyl petadiene-3,4, 2-methyl hexadiene-4,5, 2,3-pentadiene and 2,3-hexadiene. In general any alkadiene conforming to the general formula set forth above may be used wherein the substituents are not reactive with the diborane, i.e., not reduced by diborane under the conditions of the reaction. Substituents which should be avoided include aldehydes, ketones, lactones, azo groups, epoxides, cyclopropane rings, nitriles and groups bearing Zerewitinoff active hydrogen atoms.

In preparing the organoborine polymers the diborane is introduced into a reaction vessel where it reacts with the alkadiene which is generally dissolved in an inert solvent. An inert atmosphere must be preserved during the preparation of the organoborine polymers because diborane may burst into flame or explode when contacted with air. Highly purified argon is satisfactory as an inert atmosphere, but other equally inert gases such as highly purified nitrogen may be used. Before the diborane is introduced into the reaction vessel, all traces of air are thoroughly swept from the reaction system and a positive pressure is maintained by inflow of the inert gas until all the alkadiene and diborane have reacted and any residual diborane has been removed from the system.

The reaction between the diborane and the alkadiene must be carried out in the presence of an aliphatic ether. Essentially any saturated aliphatic ether may be used which satisfies all of the following requirements: (1) it can coordinate with diborane; (2) it has no substituents which will react with diborane under the reaction conditions employed for making the organoborine polymer; (3) it is stable toward cleavage under these reaction conditions. In order to facilitate the isolation of the organoborine polymer, it is preferred that the ether compound be relatively volatile (have a boiling point below about 150° C. at atmospheric pressure). The preferred ethers are dialkyl ethers such as the following: diethyl ether (B.P. 34.6° C./760 mm. Hg); diisopropyl ether (B.P. 68.3° C./760 mm. Hg); and di-n-butyl ether (B.P. 142.4° C./760 mm. Hg). Certain cyclic alkylene ethers may be used such as tetrahydrofuran (BP. 65–6° C./760 mm. Hg), tetrahydropyran (B.P. 88° C./760 mm. Hg) and 1,3-dioxane (B.P. 105–106° C./760 mm. Hg). At least 2 moles of the aliphatic ether is employed for each mole of diborane used because the conversion of the alkadiene to the organoborine polymer is much reduced when a lower proportion is present.

In addition to the saturated aliphatic ether, an inert solvent such as a saturated aliphatic hydrocarbon solvent may be used as a diluent for the reaction of the diborane with the alkadiene. Any solvent may be used which is inert to the reactants and which boils low enough to be easily removed after the organoborine polymer has formed. Representative solvents include pentane, which is preferred, cyclohexane, isooctane and n-decane. If desired, the aliphatic ethers described above for the reaction of the diborane with the alkadiene may be employed. In this instance the ether serves both as a promoter and a solvent. Other ethers which may be used include the dimethyl ether or diethyl ether of diethylene glycol. The solvent, in order that it not interfere with formation of the organoborine polymer, should be free of any groups which may be reduced by diborane under the conditions of the reaction.

In preparing the organoborine polymer there should be used about 3 moles of the alkadiene for every mole of the diborane since it has been determined that when the reactants are not employed in these proportions the yield of the desired organoborine polymer decreases. As noted above, the formation of the organoborine polymer is quite exothermic. In general, the reaction of the diborane and the alkadiene is carried out at atmospheric pressure; the maximum temperature, then, is not far above the boiling point of the alkadiene. It is to be understood, however, that the process may be operated at superatmospheric pressure. The temperatures at which satisfactory results have been achieved range from about −20° C. to about 100° C. After the diborane-alkadiene reaction is completed the resulting organoborine polymer is isolated by concentrating the reaction mixture under vacuum. The organoborine polymer should be stored under an inert atmosphere such as argon or nitrogen.

The novel organoborine polymers of the present invention may be characterized as being waxy polymers. In general these organoborine polymers react readily with oxygen and may spontaneously ignite when contacted with air. On burning, all of these compounds display the characteristic green flame of boron compounds.

The novel organoborine polymers of the present invention have a wide variety of uses. They are particularly useful in the preparation of diols. Thus the alkadiene which is used to prepare these organoborine polymers may be converted to the corresponding diol by utilizing the organoborine polymer as an intermediate product. This conversion results in a relatively pure bifunctional hydroxy compound and it will be readily appreciated that these diols have a wide variety of uses. They are solvents for essential oils, resins, dyestuffs and gums. They can be employed as components for brake fluids and as heat transfer liquids. They are blending agents and coupling agents for cutting oils and drycleaning soaps.

In preparing a diol from the organoborine polymers each atom of boron in the organoborine polymer is oxidized with 1.5 molecules of oxygen (as $O_2$ or its equivalent provided by an oxygen-bearing oxidizing agent) to obtain an intermediate which may then be hydrolyzed to the diol. This oxidation and hydrolysis may be conveniently carried out in one stage by introducing 30% aqueous hydrogen peroxide to a basic ethanolic solution of the organoborine polymer. Alternatively, air or oxygen can be introduced into an anhydrous solution of the organoborine polymer in a solvent that is not readily oxidized, such as tertiary butyl alcohol or pentane. Water is then added after the introduction of air or oxygen has been completed.

When the oxidation and hydrolysis is carried out in one step, a 30% aqueous hydrogen peroxide is added to a solution of the organoborine polymer in ethanol containing about 4–10% by weight of sodium hydroxide. About one molecule of base is supplied for every boron atom in the organoborine polymer. Since the oxidation is very exothermic, the peroxide solution is added at a rate just sufficient to maintain reflux. A slight excess of peroxide may be required before the reaction mixture displays a positive starch iodide test. When enough peroxide has been added the mixture is cooled and decanted from the precipitated sodium borate. The mixture is neutralized with acetic acid, dried, and distilled to isolate the product diol. The preparation of the diol corresponding to the alkadiene which is used to prepare the organoborine polymer is more particularly illustrated in the examples. The preparation of diols from alkadienes using organoborine polymers as intermediates is more particularly described and claimed in my copending application Serial No. 748,159, filed July 14, 1958, now abandoned.

The following examples will better illustrate the nature of the present invention; however, the invention is not intended to be limited to these examples. Parts are by weight unless otherwise indicated.

Example 1

Two reaction vessels are used. Diborane is generated in the first and contacted with the alkadiene in the second. Argon gas is swept through both vessels to displace air as completely as possible before the reaction is begun. A continual argon sweep is maintained during the reaction to maintain a positive pressure in the system. The exit vent of the second reactor is connected to a bubbler tower containing acetone; any diborane displaced from the second reactor is destroyed as it emerges from the bubbler tube below the surface of the acetone. After the reaction has been completed, argon is swept through the reaction vessels for several hours to remove residual diborane.

12 grams of propadiene (allene) is reacted in the presence of 100 milliliters of anhydrous ether and 150 milliliters of anhydrous pentane with the diborane separately generated by adding 190 milliliters of 1.0 M sodium borohydride solution to a mixture of 30 milliliters of boron trifluoride:diethyl ether complex and 50 milliliters of the dimethyl ether of diethylene glycol. The temperature of the reaction mixture rises from 0 to 5° C. during the run. Removal of the solvent under vacuum gives 8 grams of a waxy organoborine polymer which fumes in air and displays a positive test for boron (green flame). It consists essentially of a plurality of units having the structure

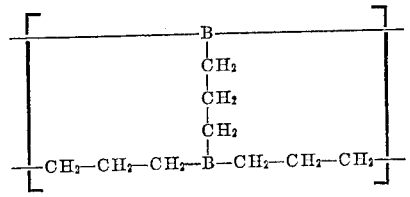

with the terminal carbon atoms of one unit being joined to separate boron atoms in adjacent units, and the terminal boron atom of one unit being joined to separate terminal carbon atoms of adjacent units.

This organoborine polymer is treated with 70 milliliters of ethyl alcohol containing 4.4 grams of sodium hydroxide. Over a 1.5-hour period 43 milliliters of 30% hydrogen peroxide is introduced with stirring. 9 grams of trimethylene glycol is isolated boiling at 105–106.5° C. (10 mm. Hg ).

Example 2

The organoborine polymer is prepared in a manner similar to that described in Example 1. The diborane is generated by dropwise addition of 600 milliliters of a 1.0 molar sodium borohydride solution (in the dimethyl ether of diethylene glycol) into 110 milliliters of a mixture of 110 milliliters of boron trifluoride:diethyl ether complex and 50 milliliters of the dimethyl ether of diethylene glycol. The diborane thereby generated and propadiene are separately and simultaneously introduced into a solution consisting of 100 milliliters of anhydrous diethyl ether and 150 milliliters of pentane over a 4-hour period. External cooling is applied to keep the temperature at −20° C. When the addition is finished, the reaction mixture is allowed to warm up to room temperature over about a 2-hour period. A flocculent white precipitate separates. The mixture is kept at room temperature for about 16 hours while protected as always by a nitrogen atmosphere. At the end of this time a copious white precipitate has separated.

The solution is syphoned through a glass tube using pure, dry nitrogen gas for pressure. The white solid remaining is washed twice with 100 milliliter portions of dry diethyl ether; the liquid is syphoned off each time. The white product is dried under vacuum for 24 hours at room temperature. 18.5 grams of an organoborine polymer is obtained which violently bursts into flame on exposure to the air. It is insoluble in ether, pentane, benzene, acetone, and ethanol. Analysis calculated for boron is 14.6%; found 14.5%.

Evaporation of the solvent from the combined organic washings gives about 11 grams of a white waxy material, which may be converted to trimethylene glycol by a procedure similar to that described in Example 1.

This application is a continuation-in-part of my copending application Serial No. 748,122, filed July 14, 1958, now abandoned.

As many widely different embodiments of this invention may be made without departing from the spirit and scope thereof, it is to be understood that this invention is not limited to the specific embodiments thereof except as defined in the appended claims.

What is claimed is:

1. An organoborine polymer consisting essentially of a plurality of units having the structure

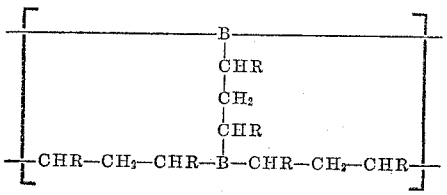

wherein R is selected from the group consisting of hydrogen and lower alkyl radicals, with the terminal carbon atoms of one unit being joined to separate boron atoms in adjacent units, and the terminal boron atom of one unit being joined to separate terminal carbon atoms of adjacent units.

2. An organoborine polymer according to claim 1 wherein R is hydrogen.

3. A process for preparing an organoborine polymer consisting essentially of a plurality of units having the srtucture

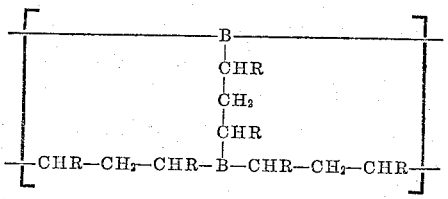

wherein R is selected from the group consisting of hydrogen and lower alkyl radicals, with the terminal carbon atoms of one unit being joined to separate boron atoms in adjacent units, and the terminal boron atom of one unit being joined to separate terminal carbon atoms of adjacent units, which comprises reacting an alkadiene having the formula RHC=C=CHR wherein R is as defined above with diborane in the presence of a saturated ether selected from the group consisting of dialkyl ethers, 1,3-dioxane, tetrahydrofuran and tetrahydropyran in an inert solvent at a temperature greater than about −20° C., with the proviso that the molar ratio of alkadiene to diborane be about 3 to 1 and the molar ratio of saturated ether to diborane be at least about 2 to 1.

4. A process according to claim 3 wherein the alkadiene is propadiene.

References Cited in the file of this patent
UNITED STATES PATENTS
2,925,437    Brown _____ Feb. 16, 1960

OTHER REFERENCES
Brown et al.: Journal Org. Chem., vol. 22, pages 1136–7 (1957).